United States Patent
Yabu

(10) Patent No.: US 11,932,773 B2
(45) Date of Patent: Mar. 19, 2024

(54) COATED PARTICLE, DISPERSION SOLUTION, DISPERSION METHOD OF COATED PARTICLES, COATING FILM, MANUFACTURING METHOD OF COATING FILM, AND COPOLYMER

(71) Applicant: TOHOKU UNIVERSITY, Miyagi (JP)

(72) Inventor: Hiroshi Yabu, Sendai (JP)

(73) Assignee: TOHOKU UNIVERSITY, Miyagi (JP)

( * ) Notice: Subject to any disclaimer, the term of this patent is extended or adjusted under 35 U.S.C. 154(b) by 243 days.

(21) Appl. No.: 17/383,622

(22) Filed: Jul. 23, 2021

(65) Prior Publication Data
US 2022/0025206 A1 Jan. 27, 2022

(30) Foreign Application Priority Data
Jul. 27, 2020 (JP) .................................. 2020-126837

(51) Int. Cl.
C09D 133/14 (2006.01)
C08F 220/18 (2006.01)
(Continued)

(52) U.S. Cl.
CPC ........ C09D 133/14 (2013.01); C08F 220/282 (2020.02); C08F 220/286 (2020.02);
(Continued)

(58) Field of Classification Search
CPC .. C08F 220/286; C08F 220/18; C08F 220/58; C08F 220/302; C09D 133/26
See application file for complete search history.

(56) References Cited

U.S. PATENT DOCUMENTS

| 2007/0207273 A1* | 9/2007 | English | C09D 127/18 |
| | | | 428/323 |
| 2008/0171836 A1* | 7/2008 | Lee | C08F 8/00 |
| | | | 525/534 |

(Continued)

FOREIGN PATENT DOCUMENTS

| JP | 2017-002326 A | 1/2017 |
| JP | 2019-052211 A | 4/2019 |

OTHER PUBLICATIONS

Na, Hee-Kyung et al. (2019). Facile synthesis and direct characterization of surface-charge-controlled magnetic iron oxide nanoparticles and their role in gene transfection in human leukemic T cell. Applied Surface Science. 483, 1069-1080. (Year: 2019).*

(Continued)

*Primary Examiner* — Kregg T Brooks
*Assistant Examiner* — David R. Foss
(74) *Attorney, Agent, or Firm* — Rimon P.C.

(57) ABSTRACT

Provided are a coated particle that enables particles with low surface free energy to be dispersed in an aqueous solvent without using a fluorochemical surfactant, a dispersion solution, a dispersion method of coated particles, a coating film, a manufacturing method of a coating film, and a copolymer. A coated particle has: a particle with surface free energy of 50 mJ/m² or less; and a copolymer in which a monomer including a hydrophilic group except for catechol groups and a monomer including at least a catechol group are copolymerized, and the particle is coated with the copolymer.

15 Claims, 5 Drawing Sheets

(51) Int. Cl.
- *C08F 220/28* (2006.01)
- *C08F 220/30* (2006.01)
- *C08F 220/58* (2006.01)
- *C09C 1/04* (2006.01)
- *C09C 3/10* (2006.01)
- *C09D 7/40* (2018.01)
- *C09D 7/62* (2018.01)
- *C09D 127/18* (2006.01)
- *C09D 133/26* (2006.01)

(52) U.S. Cl.
CPC ............... *C09C 1/043* (2013.01); *C09C 3/10* (2013.01); *C09D 7/62* (2018.01); *C09D 7/70* (2018.01); *C09D 127/18* (2013.01); *C08F 220/18* (2013.01); *C08F 220/302* (2020.02); *C08F 220/58* (2013.01); *C08F 2800/20* (2013.01); *C09D 133/26* (2013.01)

(56) References Cited

U.S. PATENT DOCUMENTS

2015/0322237 A1    11/2015  Nanba
2016/0346424 A1*   12/2016  Lee ...................... A61L 24/043

OTHER PUBLICATIONS

Grewal, Manjit Singh and Yabu, Hiroshi, "Biomimetic catechol-based adhesive polymers for dispersion of polytetrafluoroethylene (PTFE) nanoparticles in an aqueous medium" RSC Adv., 10, 4058-4063. (Year: 2020).*

* cited by examiner

COATED PARTICLE, DISPERSION SOLUTION, DISPERSION METHOD OF COATED PARTICLES, COATING FILM, MANUFACTURING METHOD OF COATING FILM, AND COPOLYMER

CROSS-REFERENCE OF RELATED APPLICATIONS

This application claims the benefit of Japanese Application No. 2020-126837, filed on Jul. 27, 2020, the entire disclosure of which Application is incorporated by reference herein.

BACKGROUND OF THE INVENTION

Field of the Invention

The disclosure in the present application relates to a coated particle, a dispersion solution, a dispersion method of coated particles, a coating film, a manufacturing method of a coating film, and a copolymer.

Description of the Related Art

Polytetrafluoroethylene (PTFE) particles are used as a binder. As an example, an electrode material and PTFE particles are kneaded, molded, and thermally treated, and an electrode with improved water repellency can then be fabricated. Further, it is known that PTFE is useful for a lubricant agent. When PTFE is used for a binder or a lubricant agent, a dispersion solution in which particles are dispersed in a solvent is used. When an aqueous solvent is used for a solvent, however, there is a problem of difficulty in dispersion because PTFE particles are aggregated in the aqueous solvent.

A reason why it is difficult to disperse PTFE particles in an aqueous solvent is in a large difference between the surface free energy of PTFE particles and the surface free energy of an aqueous solvent. In other words, without limited to PTFE particles, particles having low surface free energy have a problem of difficulty in being dispersed in an aqueous solvent in general.

To solve the problem described above, Japanese Patent Application Laid-Open No. 2019-052211 and Japanese Patent Application Laid-Open No. 2017-002326 disclose the use of a fluorochemical surfactant in order to disperse PTFE particles in an aqueous solvent.

SUMMARY OF THE INVENTION

Japanese Patent Application Laid-Open No. 2019-052211 and Japanese Patent Application Laid-Open No. 2017-002326 disclose that PTFE particles can be dispersed in an aqueous solvent. However, a fluorochemical surfactant used for dispersing PTFE particles is persistent. Therefore, there are great concerns about bioaccumulation and environmental persistence in the use of a fluorochemical surfactant. It is thus desirable to enable particles with low surface free energy to be dispersed in an aqueous solvent without using a fluorochemical surfactant.

Accordingly, the disclosure in the present application is to provide a coated particle that enables particles with low surface free energy to be dispersed in an aqueous solvent without using a fluorochemical surfactant and provide a dispersion solution, a dispersion method of coated particles, a coating film, a manufacturing method of a coating film, and a copolymer. Other optional additional advantageous effects of the disclosure in the present application will became apparent in the embodiments of the invention.

(1) A coated particle comprising:
a particle with surface free energy of 50 mJ/m$^2$ or less; and
a copolymer in which a monomer including a hydrophilic group except for catechol groups and a monomer including at least a catechol group are copolymerized,
wherein the particle is coated with the copolymer.
(2) The coated particle according to (1), wherein an HLB value of the monomer including the hydrophilic group except for catechol groups is 10 or greater.
(3) The coated particle according to (1), wherein the monomer including the hydrophilic group except for catechol groups is a monomer expressed by Formula (1):

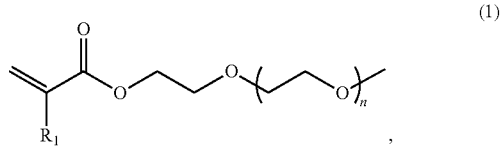

wherein $R_1$ denotes H or a linear, branched, or cyclic alkyl group having 1 to 20 carbon atoms, and $n \geq 0$.
(4) The coated particle according to (3), wherein in Formula (1), $R_1$ denotes H or a linear, branched, or cyclic alkyl group having 1 to 5 carbon atoms.
(5) The coated particle according to (3), wherein in Formula (1), $0 \leq n \leq 8$.
(6) The coated particle according to (1), wherein the copolymer includes a metal nanoparticle.
(7) A dispersion solution in which coated particles according to (1) are dispersed in an aqueous solvent.
(8) A dispersion method of coated particles, the dispersion method comprising a step of dispersing coated particles according to (1) in an aqueous solvent.
(9) A coating film manufactured by using the dispersion solution according to (7).
(10) A manufacturing method of a coating film, the manufacturing method comprising:
application step of applying the dispersion solution according to (7) to an object to be coated; and
a drying step of drying the applied dispersion solution.
(11) A copolymer in which a monomer including a hydrophilic group except for catechol groups and a monomer including at least a catechol group are copolymerized.
(12) The copolymer according to (11), wherein an HLB value of the monomer including the hydrophilic group except for catechol groups is 10 or greater.
(13) The copolymer according to (11), wherein the monomer including the hydrophilic group except for catechol groups is a monomer expressed by Formula (1):

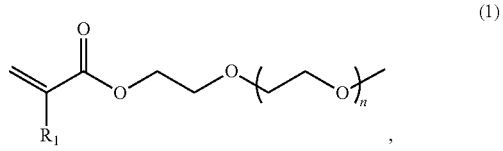

wherein $R_1$ denotes H or a linear, branched, or cyclic alkyl group having 1 to 20 carbon atoms, and $n \geq 0$.

(14) The copolymer according to (13), wherein in Formula (1), $R_1$ denotes H or a linear, branched, or cyclic alkyl group having 1 to 5 carbon atoms.
(15) The copolymer according to (13), wherein in Formula (1), $0 \leq n \leq 8$.
(16) The coated particle according to (2), wherein the monomer including the hydrophilic group except for catechol groups is a monomer expressed by Formula (1):

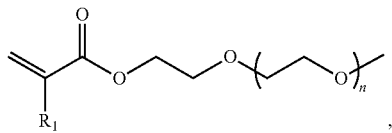

(1)

wherein $R_1$ denotes H or a linear, branched, or cyclic alkyl group having 1 to 20 carbon atoms, and $n \geq 0$.
(17) The coated particle according to (16), wherein in Formula (1), $R_1$ denotes H or a linear, branched, or cyclic alkyl group having 1 to 5 carbon atoms.
(18) The coated particle according to (4), wherein in Formula (1), $0 \leq n \leq 8$.
(19) The coated particle according to (16), wherein in Formula (1), $0 \leq n \leq 8$.
(20) The coated particle according to (17), wherein in Formula (1), $0 \leq n \leq 8$.

Particles with low surface free energy are coated with a copolymer in which a monomer including a hydrophilic group except for catechol groups and a monomer including at least a catechol group are copolymerized, and this enables the particles with low surface free energy to be dispersed in a hydrophilic solvent.

DESCRIPTION OF THE EMBODIMENTS

Figure 1:
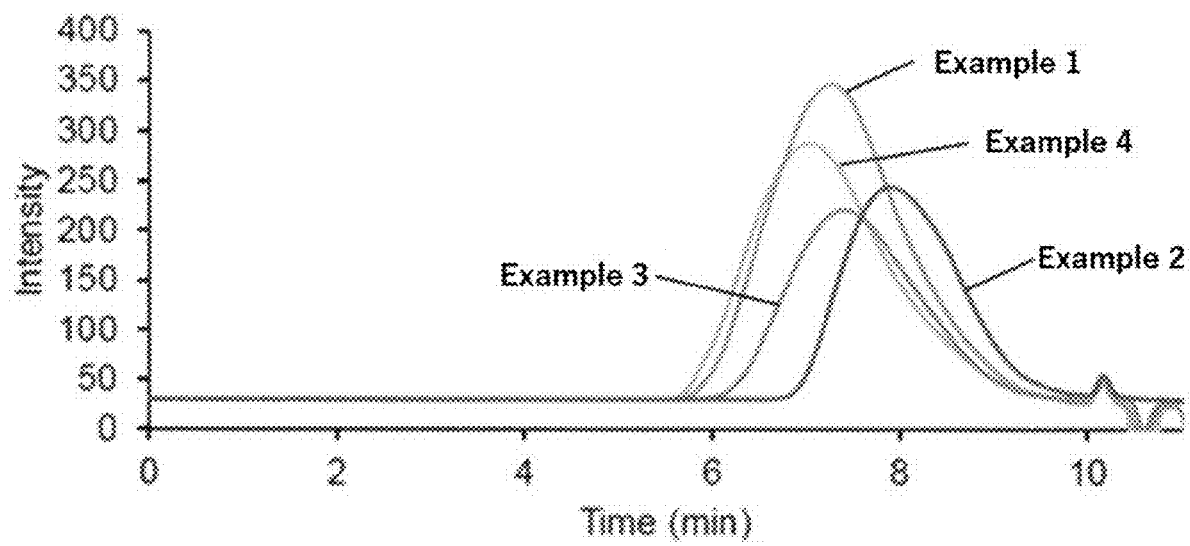
FIG. 1 illustrates a GPC measurement result for a copolymer.

A coated particle, a dispersion solution, a dispersion method of coated particles, a coating film, a manufacturing method of a coating film, and a copolymer will be more specifically described below.

Note that, in this specification, a numerical range expressed by using "to" means a range including numerical values denoted before and after "to" as the lower limit value and the upper limit value. Further, in this specification, it is construed that a numerical value, a numerical range, and a qualitative expression (for example, an expression such as "identical", "the same", or the like) indicate a numerical value, a numerical range, and a nature including an error generally accepted in the technical field of interest.

First Embodiment of Coated Particle

A coated particle according to a first embodiment includes: (1) a particle with surface free energy of 50 mJ/m² or less (hereafter, which may be simply referred to as "particle"); and (2) a copolymer in which a monomer including a hydrophilic group except for a catechol group (hereafter, which may be referred to as "first monomer") and a monomer including at least a catechol group (hereafter, which may be referred to as "second monomer") are copolymerized. Further, the particle is coated with the copolymer.
(1) Particle with Surface Free Energy of 50 mJ/m² or Less Although the type of a particle to be dispersed is not particularly limited, the particle may be a particle with a large difference in surface free energy from water, for example, a particle with surface free energy of 50 mJ/m² or less, 45 mJ/m² or less, 40 mJ/m² or less, or 36 mJ/m² or less. Examples of the particle may be a PTFE particle (surface free energy: 18 mJ/m²), a hydrocarbon particle (surface free energy: 22 mJ/m²), a polyethylene particle (surface free energy: 31 mJ/m²), a polystyrene particle (surface free energy: 33 mJ/m²), a polyvinylidene fluoride particle (surface free energy: 33 mJ/m²), a polyvinyl alcohol particle (surface free energy: 37 mJ/m²), a polyvinyl chloride particle (surface free energy: 39 mJ/m²), a polyvinylidene chloride particle (surface free energy: 40 mJ/m²), a polyethylene terephthalate particle (surface free energy: 43 mJ/m²), a nylon particle (surface free energy: 46 mJ/m²), a zinc oxide particle (surface free energy: 30.6 to 35.8 mJ/m²), or the like.

In general, when particles are dispersed in a solvent in a direct manner, this will result in an unstable state in the solvent because of large surface areas of particles, and the particles will be aggregated to lead themselves to a more stable state. It is said that dispersion of aggregated particles consists of a three-step process, specifically, which includes a wetting process, a mechanical crushing process, and a dispersion stabilization process. That is, particles are dispersed in the solvent by replacing interfaces of particles with liquid interfaces by a solvent, reducing aggregation force of particles (wetting process), dividing the aggregated particles (mechanical crushing process), and providing repulsive force between particles so as not to re-aggregate (dispersion stabilization process).

If the difference in surface free energy between a particle and a solvent is small, the wetting process will well proceed, however, if the difference is large, this makes it difficult for the wetting process to proceed. The surface free energy of water is 72.8 mJ/m². Thus, since the difference from particles having low surface free energy is large, it is difficult to disperse the particles having low surface free energy described above in an aqueous solvent.

Accordingly, a dispersion agent is used in order to facilitate the wetting process. The dispersion agent has an important role in the wetting process and the dispersion stabilization process. The dispersion agent reduces the surface free energy of a solvent to facilitate permeation of the solvent into gaps between particles. Further, in the dispersion stabilization process, the dispersion agent adsorbs onto the surface of a particle to form a coating layer, and the coating layer maintains a dispersion state of particles because of its high affinity with the solvent. The copolymer disclosed in the present application functions as a dispersion agent and thus achieves an advantageous effect of coating particles having low surface free energy and enabling the coated particles to be dispersed in an aqueous solvent.

(2) Copolymer with Copolymerized First Monomer and Second Monomer

The copolymer disclosed in the present application can be fabricated by copolymerizing the first monomer and the second monomer.

The first monomer will be described. The first monomer is intended to, after a particle is coated with a copolymer, arrange a hydrophilic group having a high affinity with an aqueous solvent on the surface of the coated particle.

The first monomer includes a polymerizing group and a hydrophilic group. While the hydrophilic group is not particularly limited as long as the affinity with an aqueous solvent is high, the HLB value of the first monomer is preferably 10 or greater, and more preferably 12 or greater. The Hydrophilic Lipophilic Balance (HLB value) is a value representing a degree of affinity with water and oil of a surfactant, and the range thereof is 0 to 20. The lipophilicity is higher when the HLB value is closer to 0, and the hydrophilicity is higher when the HLB value is closer to 20. When the HLB value of the first monomer is 10 or greater, the first monomer is sufficiently hydrophilic, and the affinity with an aqueous solvent is high. The hydrophilic group may be, for example, a polyalkylene glycol group, a phosphorylcholine group, a hydroxy group, a carboxyl group, an amino group, a sulfonic acid group, or the like.

The polymerizing group is for polymerization with another monomer. Although not particularly limited as long as polymerization is possible, the polymerizing group may be, for example, a (meth)acryloyl group, a vinyl group, an allyl group, a methallyl group, or the like and may be those having one type or two or more types of the above. In particular, a (meth)acryloyl group is preferable in terms of reactivity.

In this specification, "(meth)acryloyl group" is a concept that covers both "acryloyl group" and "methacryloyl group". The same applies to terms similar to (meth)acryloyl group, for example, "(meth)acrylic acid" is a concept that covers both "acrylic acid" and "methacrylic acid", and "(meth) acrylate" is a concept that covers both "acrylate" and "methacrylate".

An example of the first monomer may be a monomer expressed by Formula (1) below.

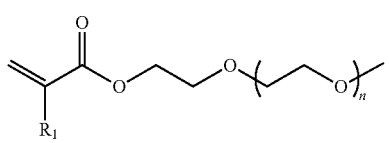

(1)

In the above Formula (1), $R_1$ denotes H or an alkyl group having 1 to 20 carbon atoms. The alkyl group having 1 to 20 carbon atoms may be any of linear, branched, and cyclic groups. In taking the HLB value of the first monomer into consideration, $R_1$ is preferably H or an alkyl group having 1 to 5 carbon atoms, more preferably H or a linear alkyl group having 3 or less carbon atoms, and even more preferably H or $CH_3$.

While n can be 0 or greater, excessively large n causes removal of the copolymer (dispersion agent) from particles and causes unstableness. Further, the copolymer disclosed in the present application contains a catechol group. While described later, the catechol group has adhesiveness and strongly adsorbs to a particle. The ethylene glycol chain of the monomer expressed by Formula (1) has high fluidity, and the solubility of the copolymer to an aqueous solvent increases when n increases, however, this may inhibit adhesion of a catechol group to a particle. It is therefore preferable for the first monomer to have n that does not inhibit adhesion of a catechol group to a particle. For example, when $0 \leq n \leq 8$, and preferably $0 \leq n \leq 6$, such n is less likely to inhibit adhesion of the catechol group to a particle. Note that a larger n makes it difficult to strictly control the number of n for manufacturing. Thus, n of the monomer expressed by the above Formula (1) is an average value. It is preferable for n to be 3 or less. A specific example of a compound expressed by the above Formula (1) may be 2-methoxyethyl (meth)acrylate, 2-(2-methoxymethoxy)ethyl (meth)acrylate, 2-(2-methoxyethoxy)ethyl (meth)acrylate, 2-(2-ethoxyethoxy)ethyl (meth)acrylate, 2-[2-(2-methoxyethoxy)ethoxy]ethyl (meth)acrylate, 2-[2-(2-ethoxyethoxy)ethoxy]ethyl (meth)acrylate, poly(ethylene glycol) methyl ether (meth)acrylate, or the like.

Next, the second monomer will be described. The catechol group has adhesiveness. Thus, the second monomer is intended to adhere the copolymer to a particle.

The second monomer includes a polymerizing group and a catechol group. The catechol group is preferably included in the second monomer, and if a second monomer is such that the catechol group becomes a side chain when copolymerized, the whole catechol group may be involved in adhesion. It is thus possible to more firmly adhere a copolymer to a particle.

The polymerizing group may be the same polymerizing group as in the first monomer described above. The second monomer may be, for example, a monomer expressed by Formula (2) below.

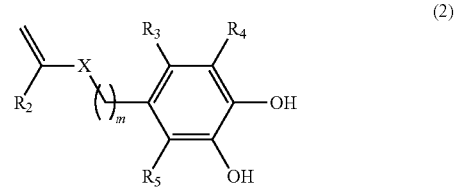

(2)

In the above Formula (2), $R_2$ denotes hydrogen or an alkyl group having 1 to 20 carbon atoms. The alkyl group having 1 to 20 carbon atoms may be any of linear, branched, and cyclic groups. $R_2$ is preferably hydrogen or an alkyl group having 1 to 5 carbon atoms, more preferably hydrogen or a linear alkyl group having 3 or less carbon atoms, and even more preferably H or $CH_3$. Each of $R_3$ to $R_5$ denotes hydrogen, a hydroxy group, a nitro group, a carboxy group, or a carbonyl group, and $R_3$ to $R_5$ may be the same or may be different from each other. While X denotes amide or ester, no X may be included. The value m denotes an integer of 0 or 1 to 10 and is preferably an integer of 0 or 1 to 5, more preferably an integer of 0 or 1 to 3, and even more preferably 2.

When X is amide, the above second monomer may be N-[2-(3,4-dihydroxyphenyl)methyl](meth)acrylamide, N-[2-(3,4-dihydroxyphenyl)ethyl](meth)acrylamide (hereafter, which may be referred to as "dopamine (meth)acrylamide" and may be simply abbreviated as DMA), N-[2-(3,4-dihydroxyphenyl)propyl](meth)acrylamide, N-[2-(3,4-dihydroxyphenyl)butyl](meth)acrylamide, N-[2-(3,4-dihydroxyphenyl)pentyl](meth)acrylamide, N-[2-(3,4-dihydroxyphenyl)hexyl](meth)acrylamide, N-[2-(3,4-dihydroxyphenyl)heptyl](meth)acrylamide, N-[2-(3,4-dihydroxyphenyl)octyl](meth)acrylamide, N-[2-(3,4-dihydroxyphenyl)nonyl](meth)acrylamide, or N-[2-(3,4-dihydroxyphenyl)decyl](meth)acrylamide.

Further, when X is ester, the above second monomer may be N-[2-(3,4-dihydroxyphenyl)methyl](meth)acrylate, N-[2-(3,4-dihydroxyphenyl)ethyl](meth)acrylate (hereafter, which may be referred to as "dopamine (meth)acrylate"), N-[2-(3,4-dihydroxyphenyl)propyl](meth)acrylate, N-[2-(3,4-dihydroxyphenyl)butyl](meth)acrylate, N-[2-(3,4-dihydroxyphenyl)pentyl](meth)acrylate, N-[2-(3,4-dihydroxyphenyl)hexyl](meth)acrylate, N-[2-(3,4-dihydroxyphenyl)heptyl](meth)acrylate, N-[2-(3,4-dihydroxyphenyl)octyl](meth)acrylate, N-[2-(3,4-dihydroxyphenyl)nonyl](meth)acrylate, or N-[2-(3,4-dihydroxyphenyl)decyl](meth)acrylate.

Further, when no X is included, the above second monomer may be 3,4-dihydroxystyrene, 3-(3,4-dihydroxyphenyl)-1-propene, 4-(3,4-dihydroxyphenyl)-1-butene, 5-(3,4-dihydroxyphenyl)-1-pentene, 6-(3,4-dihydroxyphenyl)-1-hexene, 7-(3,4-dihydroxyphenyl)-1-heptene, 8-(3,4-dihydroxyphenyl)-1-octene, 9-(3,4-dihydroxyphenyl)-1-nonene, 10-(3,4-dihydroxyphenyl)-1-decene, 3-(3,4-dihydroxyphenyl)-2-methyl-1-propene, 4-(3,4-dihydroxyphenyl)-2-methyl-1-butene, 5-(3,4-dihydroxyphenyl)-2-methyl-1-pentene, 6-(3,4-dihydroxyphenyl)-2-methyl-1-hexene, 7-(3,4-dihydroxyphenyl)-2-methyl-1-heptene, 8-(3,4-dihydroxyphenyl)-2-methyl-1-octene, 9-(3,4-dihydroxyphenyl)-2-methyl-1-nonene, 10-(3,4-dihydroxyphenyl)-2-methyl-1-decene, or the like.

The adhesiveness of a copolymer is proportional to the number of catechol groups contained in the copolymer. Therefore, when strong adhesiveness is required, the amount of adhesive monomer including a catechol group in a side chain is increased. That is, by adjusting the ratio of the adhesive monomer in the copolymer, it is possible to obtain a desired adhesive strength.

As the second monomer, a monomer derived from a dopa or its derivative is preferable in terms of performance or easy manufacturing, and a monomer derived from dopa is more preferable in terms of availability. Herein, the monomer derived from a dopa or its derivative refers to a monomer represented by m=2 out of those expressed by the above general formula (2), which is preferably the monomer derived from dopa in terms of easy manufacturing, specifically refers to the monomer that can be synthesized from dopa (3,4-dihydroxyphenylalanine), which is more preferably dopamine (meth)acrylamide or dopamine (meth)acrylate, and even more preferably dopamine (meth)acrylamide in terms of easy manufacturing.

The copolymer can be synthesized by a known synthesis method. For example, the first monomer, the second monomer, a polymerization initiator, and a solvent can be mixed and copolymerized.

The mixture ratio of the first monomer and the second monomer can be adjusted so that a desired adhesiveness to a particle or a desired affinity with an aqueous solvent is obtained. For example, addition can be made such that the ratio of the number of the second monomers to the total number of monomers of the first monomers and the second monomers is 1% to 50%, preferably 3% to 40%, and more preferably 8% to 30%. Further, as long as a desired adhesiveness to a particle or a desired affinity with an aqueous solvent is obtained, one type or two or more types of the first monomers may be used alone or in combination, and one type or two or more types of the second monomers may be used alone or in combination.

The polymerization initiator can be suitably selected from conventionally known thermo-polymerization initiators, photo-polymerization initiators, or the like. One type or two or more types of polymerization initiators may be used alone or in combination.

The thermo-polymerization initiator may be, for example, an azo-based polymerization initiator (for example, 2,2'-azobisisobutyronitrile, 2,2'-azobis (2-methylpropionamidine)disulfate, 2,2'-azobis (2-amidinopropane)dihydrochloride, 2,2'-azobis[2-(5-methyl-2-imidazolin-2-yl)propane]dihydrochloride, 2,2'-azobis (N,N'-dimethyleneisobutylamidine), 2,2'-azobis[N-(2-carboxyethyl)-2-methylpropionamidine]hydrate, 2,2'-azobis (4-methoxy-2,4-dimethylvaleronitrile), 2,2'-azobis (2,4-dimethylvaleronitrile), 2,2'-azobis(2-methylbutyronitrile), 1,1'-azobis(cyclohexane-1-carbonitrile), 2,2'-azobis (2,4,4-trimethylpentane), dimethyl-2,2'-azobis(2-methylpropionate), or the like); a persulfate such as potassium persulfate; a peroxide-based polymerization initiator (for example, dibenzoyl peroxide, t-butyl permaleate, lauroyl peroxide, or the like); a redox-based polymerization initiator; or the like. The usage of the thermo-polymerization initiator is not particularly limited and may be, for example, an amount within a range from 0.01 weight part to 5 weight parts, and preferably from 0.05 weight parts to 3 weight parts with respect to 100 weight parts of a monomer component used for preparation of an acrylic polymer.

The photo-polymerization initiator is not particularly limited, and a benzoin ether-based photo-polymerization initiator, an acetophenone-based photo-polymerization initiator, an α-ketal-based photo-polymerization initiator, an aromatic sulfonyl chloride-based photo-polymerization initiator, a photoactive oxime-based photo-polymerization initiator, a benzoin-based photo-initiator, a benzyl-based photo-polymerization initiator, a benzophenone-based photo-polymerization initiator, a ketal-based photo-polymerization initiator, a thioxanthone-based photo-polymerization initiator, an acyl phosphine oxide-based photo-polymerization initiator, or the like may be used, for example. The usage of the photo-polymerization initiator is not particularly limited and may be, for example, an amount within a range from 0.001 weight part to 0.1 weight part, and preferably from 0.005 weight parts to 0.01 weight part with respect to 100 weight parts of a monomer component.

The solvent may be aliphatic hydrocarbon such as hexane, heptane, cyclohexane, mineral turpentine, or the like; ethers such as diethyl ether, tetrahydrofuran, dioxane, diphenyl ether, anisole, dimethoxy benzene, or the like; amides such as N,N-dimethylformamide, N,N-dimethyl acetamide, or the like; nitriles such as acetonitrile, propionitrile, benzonitrile, or the like; an ester compound or a carbonate compound such as acetone, methyl ethyl ketone, methyl isobutyl ketone, ethyl acetate, butyl acetate, ethylene carbonate, propylene carbonate, or the like; alcohols such as methanol, ethanol, propanol, isopropanol, n-butyl alcohol, t-butyl alcohol, isoamyl alcohol, or the like; aromatic hydrocarbons such as benzene and toluene; or halogenated hydrocarbons such as chlorobenzene, methylene chloride, chloroform, chlorobenzene, benzotrifluoride, or the like.

The copolymer obtained by a polymerization reaction has a high affinity with an aqueous solvent and a strong adhesiveness to a particle. The copolymer may be a random copolymer or may be a block copolymer. Further, in copolymer synthesis, a monomer whose hydroxy group of the catechol group is protected by a protecting group can be used for the second monomer.

The protecting group is not particularly limited as long as it can protect and de-protect hydroxy group. For example, an acyl-type protecting group with 2 to 15 carbon atoms, an ether-type protecting group with 1 to 15 carbon atoms, an acetal-type protecting group with 3 to 15 carbon atoms, a silyl ether-type protecting group with 3 to 15 carbon atoms, an aralkyl-type protecting group with 7 to 15 carbon atoms, an allyl-type protecting group with 3 to 15 carbon atoms, or the like may be used. The acyl-type protecting group may be an acetyl group, a bivaloyl group, a benzoyl group, or the like, the ether-type protecting group may be a methyl group, a benzyl group, a p-methoxybenzyl group, a tert-butyl group, or the like, the acetal-type protecting group may be a methoxymethyl, a 2-tetrahydropyranyl group, an ethoxyethyl group, or the like, and the silyl ether-type protecting group may be a trimethylsilyl group, a triethylsilyl group, a tert-butyldimethylsilyl group, a triisopropylsilyl group, a tert-butyldiphenylsilyl group, or the like.

Specific combinations of the first monomer and the second monomer that are copolymerized may be the following combinations, for example. The following combinations are mere examples, and the invention is not limited to those combinations.

(a) Combination of 2-methoxyethyl (meth)acrylate that is the first monomer and any monomer selected from the second monomers listed below.
Second Monomer:
N-[2-(3,4-dihydroxyphenyl)methyl](meth)acrylamide,
N-[2-(3,4-dihydroxyphenyl)ethyl](meth)acrylamide,
N-[2-(3,4-dihydroxyphenyl)propyl](meth)acrylamide,
N-[2-(3,4-dihydroxyphenyl)butyl](meth)acrylamide,
N-[2-(3,4-dihydroxyphenyl)pentyl](meth)acrylamide,
N-[2-(3,4-dihydroxyphenyl)hexyl](meth)acrylamide,
N-[2-(3,4-dihydroxyphenyl)heptyl](meth)acrylamide,
N-[2-(3,4-dihydroxyphenyl)octyl](meth)acrylamide,
N-[2-(3,4-dihydroxyphenyl)nonyl](meth)acrylamide,
N-[2-(3,4-dihydroxyphenyl)decyl](meth)acrylamide,
N-[2-(3,4-dihydroxyphenyl)methyl](meth)acrylate, N-[2-(3,4-dihydroxyphenyl)ethyl](meth)acrylate, N-[2-(3,4-dihydroxyphenyl)propyl](meth)acrylate, N-[2-(3,4-dihydroxyphenyl)butyl](meth)acrylate, N-[2-(3,4-dihydroxyphenyl)pentyl](meth)acrylate, N-[2-(3,4-dihydroxyphenyl)hexyl](meth)acrylate, N-[2-(3,4-dihydroxyphenyl)heptyl](meth)acrylate, N-[2-(3,4-dihydroxyphenyl)octyl](meth)acrylate, N-[2-(3,4-dihydroxyphenyl)nonyl](meth)acrylate, N-[2-(3,4-dihydroxyphenyl)decyl](meth)acrylate, 3,4-dihydroxystyrene, 3-(3,4-dihydroxyphenyl)-1-propene, 4-(3,4-dihydroxyphenyl)-1-butene, 5-(3,4-dihydroxyphenyl)-1-pentene, 6-(3,4-dihydroxyphenyl)-1-hexene, 7-(3,4-dihydroxyphenyl)-1-heptene, 8-(3,4-dihydroxyphenyl)-1-octene, 9-(3,4-dihydroxyphenyl)-1-nonene, 10-(3,4-dihydroxyphenyl)-1-decene, 3-(3,4-dihydroxyphenyl)-2-methyl-1-propene, 4-(3,4-dihydroxyphenyl)-2-methyl-1-butene, 5-(3,4-dihydroxyphenyl)-2-methyl-1-pentene, 6-(3,4-dihydroxyphenyl)-2-methyl-1-hexene, 7-(3,4-dihydroxyphenyl)-2-methyl-1-heptene, 8-(3,4-dihydroxyphenyl)-2-methyl-1-octene, 9-(3,4-dihydroxyphenyl)-2-methyl-1-nonene, or 10-(3,4-dihydroxyphenyl)-2-methyl-1-decene.

(b) Combination of 2-(2-methoxymethoxy)ethyl (meth) acrylate that is the first monomer and any monomer selected from the second monomers listed in the above (a). Since specific examples of the second monomer are the same as those listed in "Second monomer" of the above (a), the listing of specific compound names will be omitted.

(c) Combination of 2-(2-methoxyethoxy)ethyl (meth) acrylate that is the first monomer and any monomer selected from the second monomers listed in the above (a). Since specific examples of the second monomer are the same as those listed in "Second monomer" of the above (a), the listing of specific compound names will be omitted.

(d) Combination of 2-(2-ethoxyethoxy)ethyl (meth)acrylate that is the first monomer and any monomer selected from the second monomers listed in the above (a). Since specific examples of the second monomer are the same as those listed in "Second monomer" of the above (a), the listing of specific compound names will be omitted.

(e) Combination of 2-[2-(2-methoxyethoxy)ethoxy]ethyl (meth)acrylate that is the first monomer and any monomer selected from the second monomers listed in the above (a). Since specific examples of the second monomer are the same as those listed in "Second monomer" of the above (a), the listing of specific compound names will be omitted.

(f) Combination of 2-[2-(2-ethoxyethoxy) ethoxy]ethyl (meth)acrylate that is the first monomer and any monomer selected from the second monomers listed in the above (a). Since specific examples of the second monomer are the same as those listed in "Second monomer" of the above (a), the listing of specific compound names will be omitted.

(g) Combination of poly(ethylene glycol) methyl ether (meth)acrylate that is the first monomer and any monomer selected from the second monomers listed in the above (a). Since specific examples of the second monomer are the same as those listed in "Second monomer" of the above (a), the listing of specific compound names will be omitted.

The coated particle disclosed in the present application is obtained by covering a particle with the copolymer described above. The catechol group included in the copolymer adheres to a particle, and a hydrophilic group included in the copolymer has a high affinity with an aqueous solvent. Thus, since the existence of the hydrophilic group on the surface of a coated particle allows the coated particle to have a high affinity with an aqueous solvent, the coated particles can be dispersed in the aqueous solvent. Therefore, the copolymer disclosed in the present application can be used as a dispersion agent as an alternative to the conventionally used fluorochemical surfactant.

The coating of a copolymer on the particle can be obtained by mixing a copolymer to an organic solvent, adding the particles thereto, and stirring the mixture, for example.

The coated particle according to the first embodiment can be used as a binder for an electrode material, a coating film material, or the like and can be used in fabrication of an electrode, for example. An electrode with improved water repellency can be fabricated by kneading, molding, and thermally treating a dispersion solution with dispersed coated particles in an aqueous solvent and an electrode material. Note that, as long as a dispersion solution with dispersed particles with low surface free energy is used as a binder, the coated particle disclosed in the present application can be used, and the use thereof is not limited.

Further, when the particle has lubricity, the coated particles can be used as a lubricant. For example, the coated particles are dispersed in a plating bath, and plating is performed thereon. Then, the coated particles are present in a dispersed state in a plating film. The copolymers of the coated particles are then removed by sliding or the like with a member in contact with the plating film, and lubricated particles, for example, PTFE particles are exposed. This results in good sliding between the plating film and the member in contact with the plating film.

Furthermore, zinc oxide is white and has high thermal conductivity and thus is used as a white pigment, a heat radiation material, or the like. When zinc oxide is used for a particle, the coated particle can also be used as a white pigment, a heat radiation material, or the like that can be dispersed in an aqueous solvent.

Second Embodiment of Coated Particle

Next, the second embodiment of a coated particle will be described. The second embodiment of the coated particle differs from the first embodiment in that the coated particle carries a nanoparticle, and other features are the same as those of the coated particle according to the first embodiment. Therefore, in the second embodiment, features different from the first embodiment will be mainly described, and duplicated description for the features already described in the first embodiment will be omitted. Thus, needless to say, the feature already described in the first embodiment can also be employed in the second embodiment even when not explicitly described in the second embodiment.

The copolymer covering a coated particle according to the second embodiment has a catechol group as described above. The catechol group has a hydroxy group and thus has electro-donicity in addition to adhesiveness. That is, the catechol group not used for adhesion to a particle having low surface free energy in the copolymer can be used as a reducing agent.

When the catechol group is used as a reducing agent, for example, a nanoparticle or the like can be carried inside the copolymer of a coated particle. A process of causing the copolymer to carry a nanoparticle is performed by adding precursor ions for the nanoparticles to a solution in which the coated particles are dispersed. The added precursor ion is reduced by the catechol group, and a nanoparticle is formed inside the copolymer.

Note that, in this specification, "nanoparticle" means a particle resulted from that a precursor ion of a nanoparticle is donated with an electron from a hydroxy group of catechol and thereby reduced. The particle diameter of "nanoparticle" varies in accordance with the material type and corresponds to a size from the atom size of each material to about 100 nm.

The type of the nanoparticle is not particularly limited and may be, for example, a metal such as gold (Au), silver (Ag), platinum (Pt), palladium (Pd), rhodium (Rh), iridium (Ir), ruthenium (Ru), osmium (Os), or copper (Cu); a metal compound such as Cds, CeSe, CeTe, or ZnS; a ferrimagnetic material such as $Fe_2O_3$; an alloy such as Ag/Au or Au/Pt; or the like.

Note that, while a precursor ion is donated with an electron from a hydroxy group of catechol and thereby reduced to be a nanoparticle, the nanoparticle is then re-ionized if a precursor ion having a smaller ionization tendency is added, and the added precursor ion having smaller ionization tendency is reduced to be a nanoparticle. In this specification, "alloy" means a substance in which the ionization tendency described above is utilized and metal particles having different ionization tendencies are mixed. The oxide such as $Fe_2O_3$ can be obtained by reducing a precursor ion and then oxidizing the reduced precursor ion with bubbling of oxygen. Further, the sulfide such as CdS can be obtained by reducing a precursor ion and then sulfurizing the reduced precursor ion with bubbling of hydrogen sulfide gas. The metal compound such as CeTe can be obtained by reducing respective ions in a coexistence state. Note that the above "alloy" may also be obtained by reducing respective ions in a coexistence state when the ionization tendencies thereof are close to each other.

An inorganic salt used for manufacturing the above nanoparticle is not particularly limited as long as it is ionized in an aqueous solvent as described above and may be, for example, gold chloride(III) ($AuCl_3$), tetrachloroauric(III) acid (chloroauric acid) ($HAuCl_4$), silver(I) nitrate ($AgNO_3$), hexachloridoplatinic(IV) acid $H(H_2[PtCl_6]\cdot(H_2O)_6)$, palladium chloride ($PdCl_2$), rhodium sulfate ($O_4Rh_2S$), potassium hexachloroiridate ($Cl_6IrK_2$), tetrapropylammonium perruthenate ($(C_3H_7)_4N^+RuO_4^-$), osmium tetroxide ($O_4Os$), copper sulfate ($CuSO_4$), cadmium chloride ($CdCl_2$), cerium (III) sulfate octahydrate ($Ce_2(SO_4)_3 \cdot 8H_2O$), selenium tetrachloride ($SeCl_4$), tellurium sulfide (TeS), zinc sulfate ($ZnSO_4$), iron chloride ($FeCl_2$), or the like. These salts may be added directly in an inorganic salt state to a dispersion solution in which the coated particles are dispersed or can be added after dissolved with a suitable solvent.

When a nanoparticle to be carried by the copolymer of the coated particle is a metal, the coated particles can also be utilized as a catalyst. For example, when PTFE is used for a particle with low surface free energy, the melting point of PTFE is 327 degrees Celsius. Thus, coated particles carrying metal nanoparticles can be dispersed even in a high temperature state and therefore can be suitably used in a reaction utilizing a catalyst.

Further, a high antifouling property can be expected because of catalytic activity of metal nanoparticles when coated particles carrying metal nanoparticles in the copolymer are dispersed in a coating film.

Coated Particle Dispersion Solution

The coated particle according to the first embodiment and the coated particle according to the second embodiment can be dispersed in an aqueous solvent. Dispersion in an aqueous solvent can be made by adding the coated particles to the aqueous solvent and stirring the mixture.

The aqueous solvent is not particularly limited and is typically water. The aqueous solvent may include a water-soluble organic solvent or the like in terms of improved stability when left untreated. The water-soluble organic solvent may be alcohols such as methanol, ethanol, n-propanol, isopropanol, n-butanol, or isobutanol; esters such as methyl acetate or ethyl acetate; glycol derivatives such as ethylene glycol, ethylene glycol monomethyl ether, or ethylene glycol monoethyl ether; dimethyl sulfoxide (DMSO); dimethylformamide (DMF); tetrahydrofuran (THF); or the like. Note that one type of these organic solvents may be used alone, or two or more types of these organic solvents may be used in combination.

Coating Film Formed of Coated Particle Dispersion Solution and Manufacturing Method of Coating Film A coating film can be manufactured when the coated particle dispersion solution described above is applied to an object to be coated. The coating film is manufactured by an application step of applying a coated particle dispersion solution to an object to be coated and a drying step of drying the applied dispersion solution.

The object to be coated to which a dispersion solution is applied is not particularly limited as long as the dispersion solution can be applied thereon. The object to be coated may be, for example, a metal, various plastics, an inorganic material such as a glass, a wood material, or the like or may be a composite material of the above. Further, the object to be coated may be an object on which surface processing or the like has been performed. Further, the thickness of the coating film is not particularly limited and may be determined as appropriate in accordance with the object to be coated.

The manufacturing method of a coating film includes an application step and a drying step. In the application step, the dispersion solution is applied to an object to be coated. The application method of the dispersion solution is not particularly limited as long as the dispersion solution can be applied to the object to be coated. The application method may be, for example, an application method using spray application, roll coating, screen printing, a blade coater, a die coater, a calendar coater, a meniscus coater, a bar coater, a spin coater, or the like.

The drying step is to dry the dispersion solution applied to the object to be coated. The drying method of the dispersion solution is not particularly limited as long as the dispersion solution can be dried. The drying method may be, for example, a method of leaving (air-drying) the object in the air or an inert gas such as nitrogen, a method of heating and drying the object in a hot air oven, an infrared heating furnace, or the like, a method of performing drying under reduced pressure in a vacuum dryer, or the like, or the like and these methods may be combined.

With the coating film being formed, the surface of the coated object has a function in accordance with the coated particle. For example, when a PTFE particle is used for the particle, a highly lubricated surface of the coated object can be obtained. Further, when a zinc oxide particle is used for the particle, a white surface of the coated object can be obtained, or a highly heat-dissipating surface can be obtained.

Although Examples are presented below and the embodiment disclosed in the present application will be specifically described, these Examples are only for the purpose of illustration of the embodiment. The Examples are intended neither to limit the scope of the invention disclosed in the present application nor to express such limitation.

EXAMPLES

Example 1

Synthesis of Copolymer with Copolymerized DMA and EEA

A copolymer with copolymerized dopamine methacrylamide (DMA) and 2-(2-ethoxyethoxy)ethyl acrylate (EEA) is synthesized by the process described below.

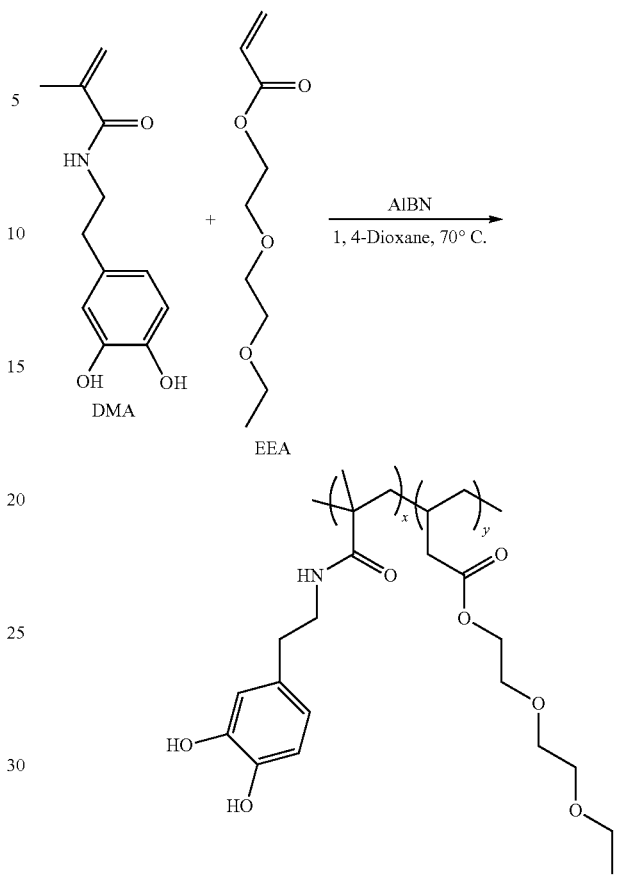

The followings:
Dopamine methacrylamide (DMA; by Tokyo Chemical Industry Co., Ltd.), 200 mg,
2-(2-ethoxyethoxy)ethyl acrylate (EEA; by Tokyo Chemical Industry Co., Ltd., HLB value of 14.4), 1430 mg,
2,2'-Azobis(isobutyronitrile) (AIBN; by Sigma-Aldrich Co. LLC), 15 mg, and
Dehydrated 1,4-dioxane (by FUJIFILM Wako Pure Chemical Corporation), 40 mL were supplied to a double-bottomed round flask to react under a nitrogen atmosphere at 70 degrees Celsius for 12 to 15 hours. The weight ratio of DMA and EEA was 1:7.2 (molecular ratio was 1:8.4). The reacted solution was diluted with 20 mL of 1,4-dioxane, and the diluted solution was added to 500 mL of hexane and re-precipitated. Vacuum drying was then performed at 60 degrees Celsius overnight to obtain a random copolymer. The molecular weight of the obtained random copolymer was measured by a gel permeation chromatograph (GPC) method. From the GPC result, the number average molecular weight (Mn) was 7920, and the weight average molecular weight (Mw) was 19700.

Example 2

A random copolymer was synthesized in the same process as that in Example 1 except that the amount of EEA was 500 mg and the weight ratio of DMA and EEA was 1:2.5 (molecular ratio was 1:2.9) in the copolymer synthesis. The Mn was 6820, and the Mw was 14100.

Example 3

A random copolymer was synthesized in the same process as that in Example 1 except that the amount of EEA was 1000 mg and the weight ratio of DMA and EEA was 1:5 (molecular ratio was 1:5.9) in the copolymer synthesis. The Mn was 13600, and the Mw was 33600.

Example 4

A random copolymer was synthesized in the same process as that in Example 1 except that the amount of EEA was 2000 mg and the weight ratio of DMA and EEA was 1:10 (molecular ratio was 1:11.8) in the copolymer synthesis. The Mn was 18700, and the Mw was 61200. FIG. 1 illustrates measurement results by GPC for Example 1 to Example 4.

Example 5

Mechanical Characteristics of Copolymer

Figure 2:
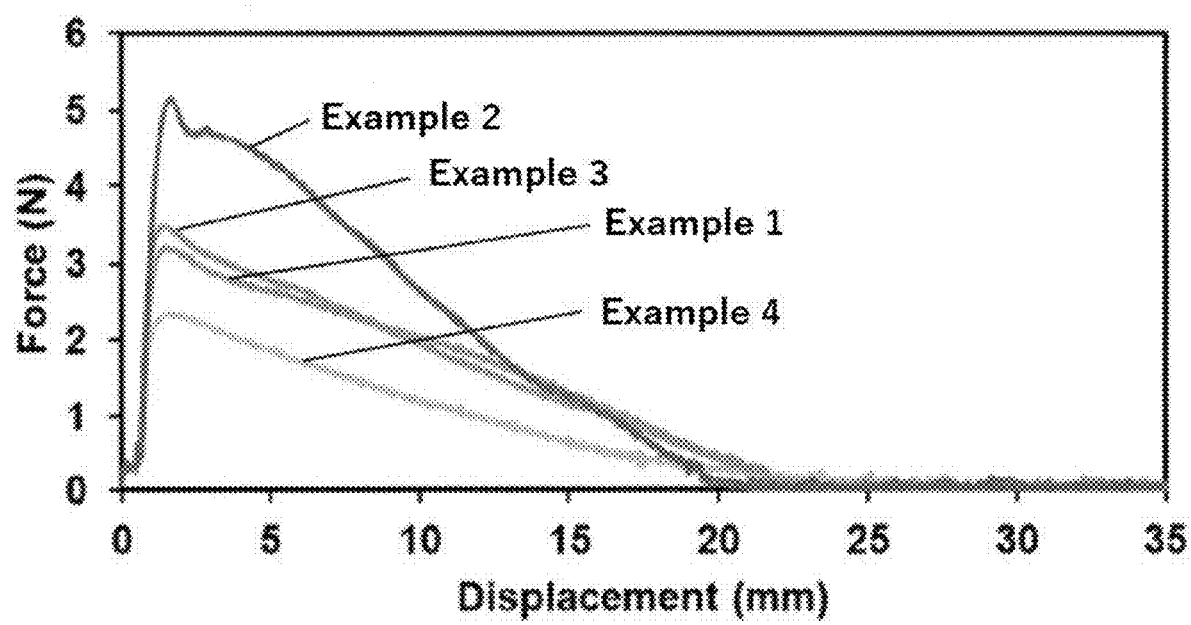
FIG. 2 illustrates a load displacement curve of a copolymer.

The adhesive strength of the copolymer was measured. The measurement was performed by applying the copolymer onto a rectangular glass (3 cm×1 cm) and laminating a PTFE sheet thereon. The PTFE sheet was then pulled apart at an elongation rate of 1 mm/min at room temperature. FIG. 2 illustrates a load displacement curve. The obtained result was that the adhesive strength decreased in the order of the weight ratio of DMA and EEA in the copolymer synthesis of 1:2.5 (Example 2), 1:5 (Example 3), 1:7.2 (Example 1), and 1:10 (Example 4). That is, it was indicated that the adhesive strength is higher when the copolymer includes more amount of DMA.

Example 6

Figure 3:
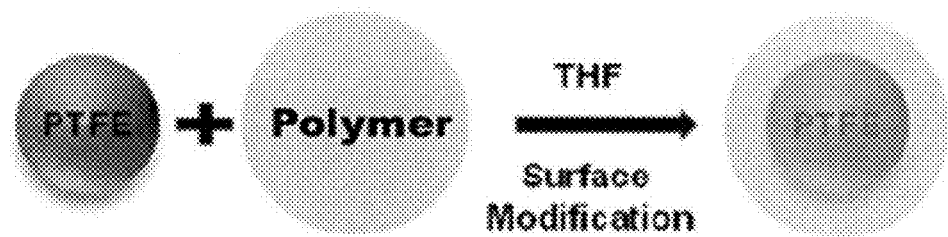
FIG. 3 is a schematic fabrication diagram of a coated particle.

Fabrication of PTFE Particle Coated with Copolymer Fabricated in Example 1 and Fabrication of Dispersion Solution with Dispersed PTFE Particles PTFE particles coated with the copolymer fabricated in Example 1 (hereafter, which may be referred to as "PTFE coated particle 1") and a dispersion solution in which the PTFE coated particles 1 were dispersed were fabricated in the following process by using PTFE particles as particles with the surface free energy of 50 mJ/m² or less. FIG. 3 illustrates a schematic diagram of fabrication of the coated particle.

Figure 4:
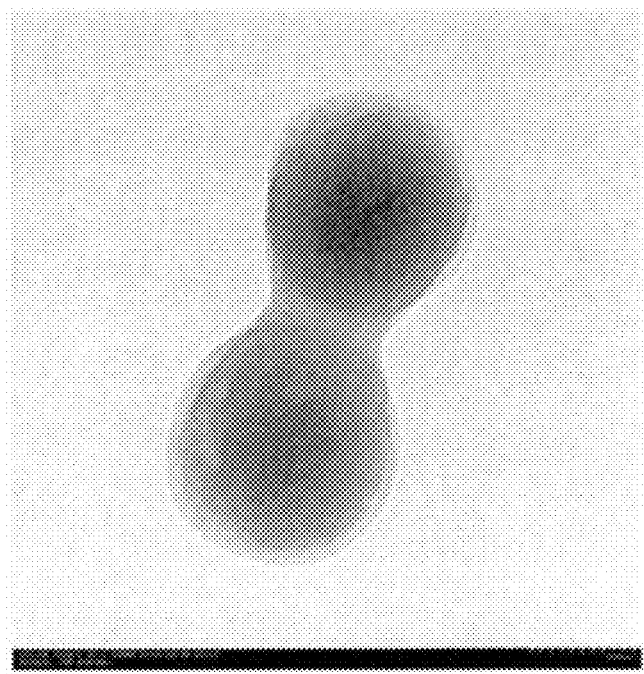
FIG. 4 is a photograph substitute for a drawing illustrating a TEM image of a PTFE coated particle.

Mixed were 3 mL of a THF solution including PTFE particles (by Okuno Chemical Industries Co. Ltd., diameter: 100 nm, surface free energy: 18 mJ/m²) at a concentration of 5 mg/mL and 3 mL of a THF solution including the copolymer fabricated in Example 1 at a concentration of 10 mg/mL. The mixed solution was stirred by a homogenizer for 5 minutes. Then, centrifugation at 10000 rpm and washing with water were repeated for three times, the obtained particles were suspended in 5 mL of water, and large aggregates were separated by applying ultrasonic waves thereto for 2 minutes. FIG. 4 is a TEM image of the PTFE coated particle 1. It was confirmed from the TEM image illustrated in FIG. 4 that the PTFE particle can be coated by the copolymer.

Comparative Example 1

PTFE particles not coated with the copolymer were suspended in water to fabricate a solution.

Figure 5:
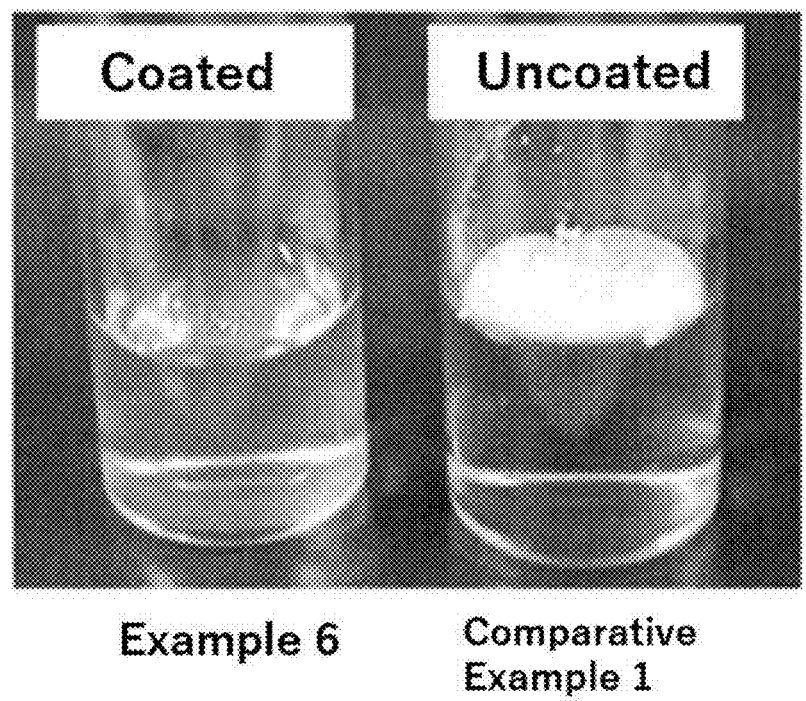
FIG. 5 is a photograph substitute for a drawing illustrating a dispersion solution with dispersed PTFE coated particles.

FIG. 5 illustrates a suspension liquid in which the PTFE coated particles 1 were suspended (Example 6) and a suspension liquid in which uncoated PTFE particles were suspended (Comparative Example 1). In Comparative Example 1, no PTFE particle is dispersed in water, and in Example 6, the suspension liquid was transparent. It was indicated from the above result that the use of the copolymer disclosed in the present application enables particles with low surface free energy to be dispersed in water.

Example 7

Fabrication of PTFE Coated Particle 1 Carrying Nanoparticle

Figure 6:
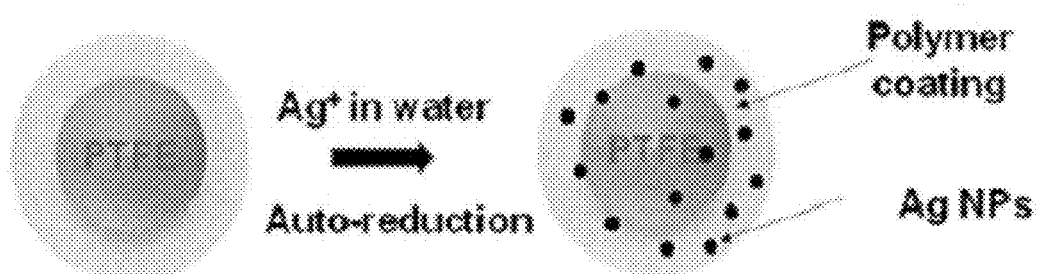
FIG. 6 is a schematic fabrication diagram of a PTFE coated particle with a nanoparticle carried by a copolymer.
Figure 7:
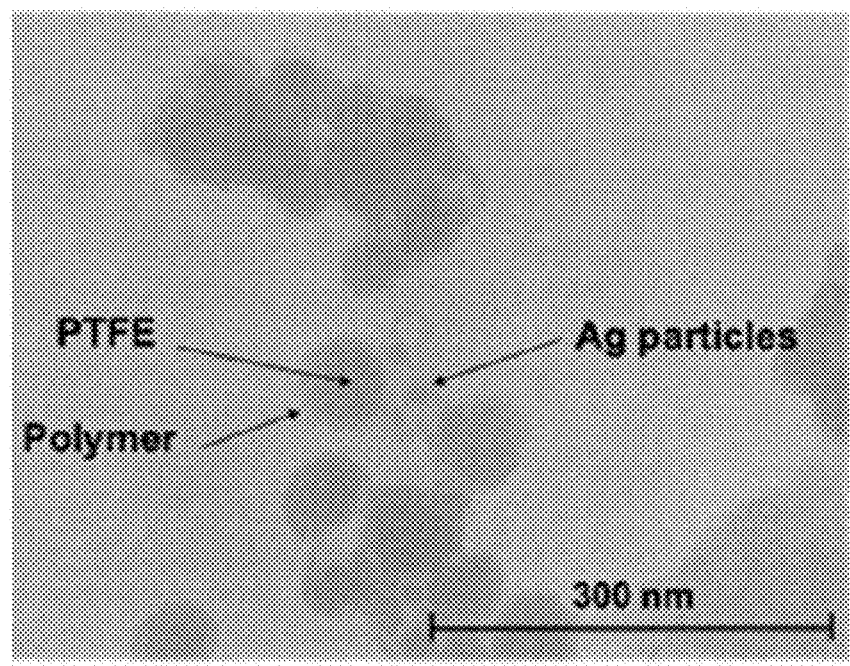
FIG. 7 is a photograph substitute for a drawing illustrating a TEM image of a PTFE coated particle carrying a Ag nanoparticle.

Next, the PTFE coated particle 1 fabricated in Example 6 was caused to carry a nanoparticle. FIG. 6 illustrates a schematic diagram. First, 2 mL of $AgNO_3$ solution was mixed to a dispersion solution in which the PTFE coated particles 1 (10 mg) fabricated in Example 6 were dispersed in 2 mL of water, and the mixture was stirred. In the mixture liquid, the color of the PTFE coated particles 1 turned orange within a few minutes. Then, the mixture liquid was reacted with Ag ions and catechol groups of the copolymer at 25 degrees Celsius overnight. The reacted mixture liquid was centrifuged at 10000 rpm and washed with distilled water for three times in order to remove excessive Ag ions. The obtained PTFE coated particles 1 were re-dispersed in water. FIG. 7 illustrates a TEM image of the obtained PTFE coated particle 1.

It can be found from FIG. 7 that the Ag nanoparticle was carried by the copolymer coating the PTFE particle. It was indicated that the catechol group of the copolymer serves as a reducing agent and reacts with an Ag ion, and an Ag nanoparticle is formed in the copolymer.

Example 8

Fabrication of Zinc Oxide Particle Coated with Copolymer Fabricated in Example 1 and Fabrication of Dispersion Solution with Dispersed Zinc Oxide Particles Zinc oxide particles coated with the copolymer fabricated in Example 1 (hereafter, which may be referred to as "zinc oxide coated particle") and a dispersion solution in which the zinc oxide coated particles were dispersed were fabricated in the following process by using zinc oxide particles as particles with the surface free energy of 50 mJ/m² or less.

Mixed were 3 mL of a THF solution including zinc oxide particles (by Sakai Chemical Industry Co. Ltd., average diameter: 20 nm, surface free energy: 30.6 to 35.8 mJ/m²) at a concentration of 5 mg/mL and 3 mL of a THF solution including the copolymer fabricated in Example 1 at a concentration of 10 mg/mL. The mixed solution was stirred by a homogenizer for 5 minutes, and the copolymer was coated on the zinc oxide particles. Then, a dispersion solution in which zinc oxide coated particles were dispersed in water was obtained in the same method as in Example 6.

Comparative Example 2

A solution in which zinc oxide particles without coated with the copolymer were suspended in water was fabricated.

Figure 8:
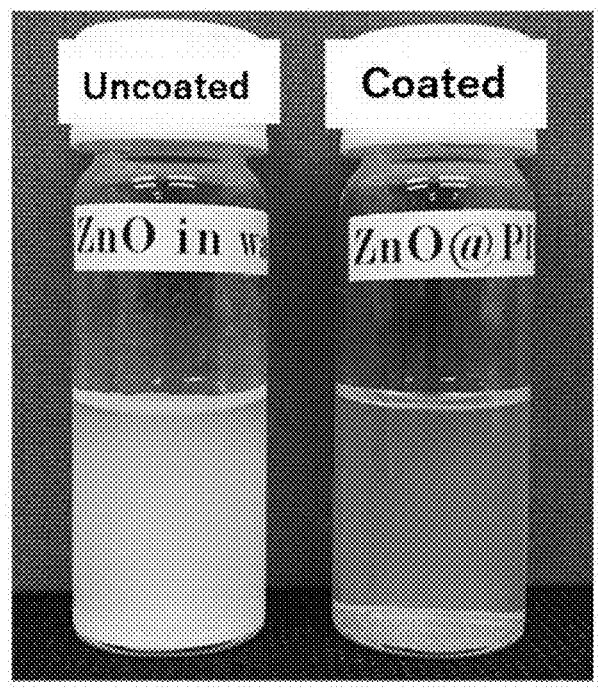
FIG. 8 is a photograph substitute for a drawing illustrating a dispersion solution with dispersed zinc oxide coated particles.

FIG. 8 illustrates a suspension liquid in which the zinc oxide coated particles were suspended (Example 8) and a suspension liquid in which the uncoated zinc oxide particles were suspended (Comparative Example 2). In Comparative Example 2, zinc oxide particles were aggregated, and cloudiness and precipitation due to coarse particles thereof were observed. In Example 8, however, the suspension liquid was not clouded, and the light transmittance increased. This indicates that the zinc oxide particles are dispersed with its original particle size (several tens nm) and thereby light scattering is suppressed. It was indicated from the above that zinc oxide coated particles can be dispersed in THF.

Example 9

Fabrication of Coating Film Using Dispersion Solution Fabricated in Example 8

A coating film was fabricated by using the dispersion solution fabricated in Example 8. The coating film was fabricated in the following process.

The dispersion solution fabricated in Example 8 was applied to a glass substrate. The THF was then dried to fabricate a coating film on the glass substrate.

Figure 9A:
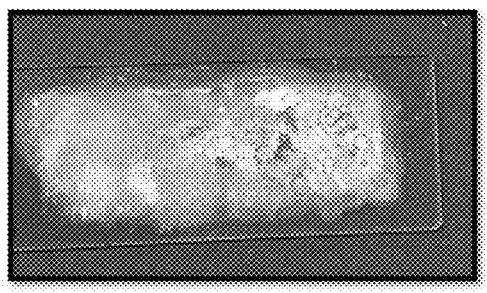
FIG. 9A is a photograph substitute for a drawing illustrating a coating film fabricated with a dispersion solution with dispersed zinc oxide coated particles.
Figure 9B:
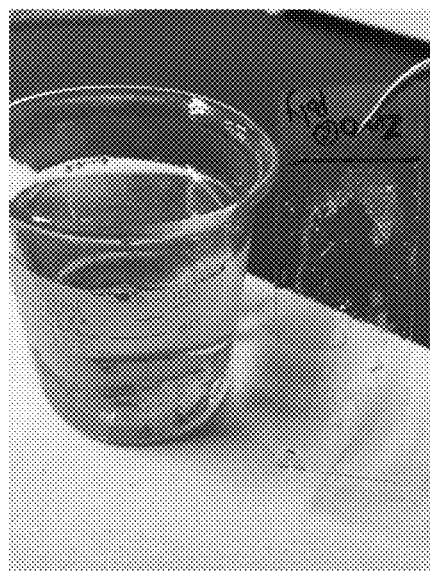
FIG. 9B is a photograph substitute for a drawing illustrating a glass substrate from which a coating film is removed by an alkaline solution.

FIG. 9A illustrates the fabricated coating film. Even when the fabricated coating film was immersed in water, the coating film was not removed. Further, when the coating film was immersed in an alkaline solution to quinonize the catechol group of the copolymer fabricated in Example 1, the coating film was removed from the glass substrate, as illustrated in FIG. 9B. Therefore, it was indicated that the zinc oxide coated particle is firmly fixed to a glass by a catechol group.

Example 10

Synthesis of Copolymer with Copolymerized EEA and PEGMEA

A copolymer in which dopamine methacryl amide (DMA) and poly(ethylene glycol)methyl ether acrylate (PEGMEA) were copolymerized was synthesized by the process described below.

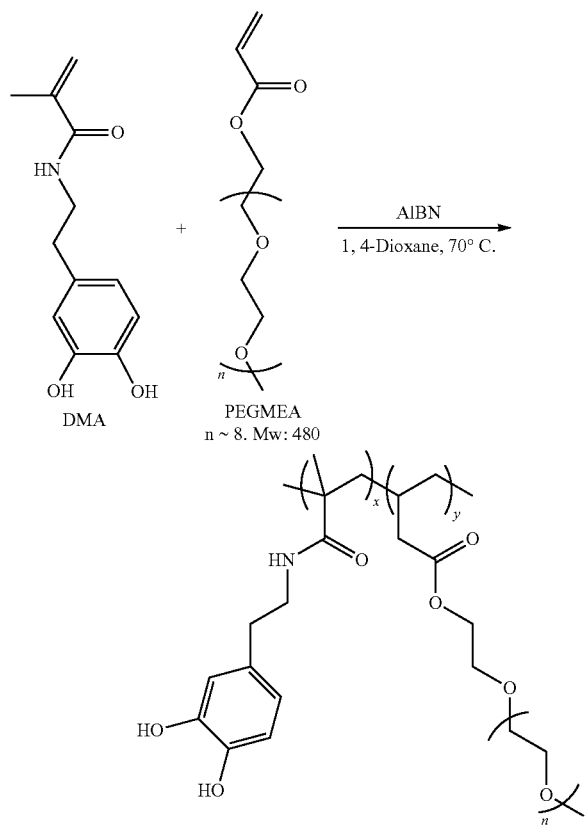

The followings:
DMA, 0.2 mg,
poly(ethylene glycol)methyl ether acrylate (PEGMEA (n≤8) by Sigma Aldrich), 1430 mg,
AIBN, 15 mg, and
dehydrated 1,4-dioxane, 40 mL were supplied to a double-bottomed round flask to react under a nitrogen atmosphere at 70 degrees Celsius for 12 to 15 hours. The molecular ratio of DMA and PEGMEA was 1:7.2. The reacted solution was diluted with 20 mL of 1,4-dioxane, and the diluted solution was added to 500 mL of hexane and re-precipitated. Vacuum drying was then performed at 60 degrees Celsius overnight to obtain a random copolymer. The molecular weight of the obtained random copolymer was measured by the GPC method. From the GPC result, the number average molecular weight (Mn) was 20464, and the weight average molecular weight (Mw) was 27850.

Example 11

Fabrication of PTFE Particle Coated with Copolymer Fabricated in Example 10 and Fabrication of Dispersion Solution with Dispersed PTFE Particles PTFE particles coated with the copolymer fabricated in Example 10 (hereafter, which may be referred to as "PTFE coated particle 2") and a dispersion solution in which the PTFE coated particles 2 were dispersed were fabricated in the following process.

Mixed were 3 mL of a THF solution including PTFE particles (by Okuno Chemical Industries Co. Ltd., diameter: 100 nm, surface free energy: 18 mJ/m$^2$) at a concentration of 5 mg/mL and 3 mL of a THF solution including the copolymer fabricated in Example 10 at a concentration of 10 mg/mL. The mixed solution was stirred by a homogenizer for 5 minutes. Then, centrifugation at 10000 rpm and washing with water were repeated for three times, the obtained particles was suspended in 5 mL of water, and a dispersion solution in which large aggregates were separated by applying ultrasonic waves thereto for 2 minutes was obtained.

A hydrophilic group with a high affinity with an aqueous solvent is present on the surface of a coated particle in which a particle with low surface free energy is coated with a copolymer in which the first monomer and the second monomer are copolymerized. As a result, particles with low surface free energy can be dispersed in the aqueous solvent. Therefore, the coated particle disclosed in the present application is useful for technical fields of electrode materials, coating film materials, plating, catalysts, and the like.

The present application is based on and claims priority from Japanese Patent Application No. 2020-126837, filed Jul. 27, 2020, the disclosure of which is hereby incorporated by reference herein in its entirety.

What is claimed is:
1. A coated particle comprising:
   a particle with surface free energy of 50 mJ/m$^2$ or less; and
   a copolymer in which a monomer including a hydrophilic group except for catechol groups and a monomer including at least a catechol group are copolymerized, wherein the particle is coated with the copolymer.
2. The coated particle according to claim 1, wherein an FMB (Hydrophilic Lipophilic Balance) value of the monomer including the hydrophilic group except for catechol groups is 10 or greater.

3. The coated particle according to claim 2, wherein the monomer including the hydrophilic group except for catechol groups is a monomer expressed by Formula (1):

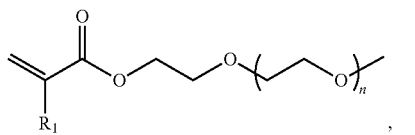
(1)

wherein R1 denotes H or a linear, branched, or cyclic alkyl group having 1 to 20 carbon atoms, and n≥0.

4. The coated particle according to claim 3, wherein in Formula (1), R1 denotes H or a linear, branched, or cyclic alkyl group having 1 to 5 carbon atoms.

5. The coated particle according to claim 4, wherein in Formula (1), 0≤n≤8.

6. The coated particle according to claim 3, wherein in Formula (1), 0≤n≤8.

7. The coated particle according to claim 1, wherein the monomer including the hydrophilic group except for catechol groups is a monomer expressed by Formula (1):

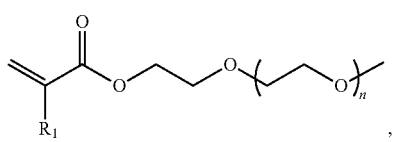
(1)

wherein R1 denotes H or a linear, branched, or cyclic alkyl group having 1 to 20 carbon atoms, and n≥0.

8. The coated particle according to claim 7, wherein in Formula (1), R1 denotes H or a linear, branched, or cyclic alkyl group having 1 to 5 carbon atoms.

9. The coated particle according to claim 8, wherein in Formula (1), 0≤n≤8.

10. The coated particle according to claim 7, wherein in Formula (1), 0≤n≤8.

11. The coated particle according to claim 1, wherein the copolymer includes a metal nanoparticle different from the particles coated with the copolymer.

12. A dispersion solution in which coated particles according to claim 1 are dispersed in an aqueous solvent.

13. A coating film manufactured by using the dispersion solution according to claim 12.

14. A manufacturing method of a coating film, the manufacturing method comprising:

application step of applying the dispersion solution according to claim 12 to an object to be coated; and a drying step of drying the applied dispersion solution.

15. A dispersion method of coated particles, the dispersion method comprising a step of dispersing coated particles according to claim 1 in an aqueous solvent.

* * * * *